United States Patent
Hoke et al.

(10) Patent No.: US 10,035,405 B2
(45) Date of Patent: Jul. 31, 2018

(54) LOUVERED RAIN-HAT FOR THE FRESH AIR INLET OF A VEHICLE

(75) Inventors: Paul Bryan Hoke, Plymouth, MI (US); Mark Doroudian, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 993 days.

(21) Appl. No.: 13/175,420

(22) Filed: Jul. 1, 2011

(65) Prior Publication Data

US 2013/0005232 A1  Jan. 3, 2013

(51) Int. Cl.
*B60H 1/24* (2006.01)
*B60H 1/28* (2006.01)
*E06B 7/08* (2006.01)

(52) U.S. Cl.
CPC . *B60H 1/28* (2013.01); *E06B 7/08* (2013.01)

(58) Field of Classification Search
CPC .......... B60H 1/28; B60H 1/24; B60H 3/0641; B62D 25/081; E06B 7/08; F24F 13/081
USPC ..... 454/146, 147; 55/DIG. 37, 467.1, 385.3; 180/69.25
See application file for complete search history.

(56) References Cited

U.S. PATENT DOCUMENTS

| | | | | |
|---|---|---|---|---|
| 1,474,075 A | * | 11/1923 | Gallaugher | .................... 454/147 |
| 2,221,891 A | * | 11/1940 | Young | ................ B60H 1/00071 454/139 |
| 2,257,638 A | * | 9/1941 | Moore | ................. B60H 3/0641 454/148 |
| 2,267,824 A | * | 12/1941 | Griffith | .................... B60H 1/26 454/94 |
| 2,276,279 A | * | 3/1942 | Asklund | .............. B60K 11/085 180/68.1 |
| 2,367,904 A | * | 1/1945 | Ulrich | ...................... B60H 1/28 454/149 |
| 2,372,377 A | * | 3/1945 | Hans | ........................ B60H 1/28 454/147 |
| 2,383,639 A | * | 8/1945 | Ferguson | ................ E04F 10/08 454/221 |
| 2,577,317 A | * | 12/1951 | Eschrich | ................ A45B 25/18 135/15.1 |

(Continued)

FOREIGN PATENT DOCUMENTS

| | | | | |
|---|---|---|---|---|
| DE | 102008052441 A1 | * | 4/2010 | ............... B60H 1/28 |
| GB | 295346 A | * | 8/1928 | ............... B60H 1/26 |

(Continued)

*Primary Examiner* — Alissa Tompkins
*Assistant Examiner* — Phillip E Decker
(74) *Attorney, Agent, or Firm* — LeClairRyan

(57) ABSTRACT

A rain-hat system for use on a vehicle that includes a cowling having a fresh air inlet, a rain-hat assembly that includes a body, and a plurality of louvers is disclosed. The body has a back side for attachment to the fresh air inlet. The body also has front side to which the plurality of louvers is attached. The rain-hat assembly also includes a front, a back, a first side, and a second side. At least some of the louvers slope downwardly from the front to the back and at least some of the louvers slope downwardly from the first side to the second side. In addition, at least some of the louvers include a downwardly sloping flange attached at the first side and a downwardly sloping flange attached at the second side. Preferably the uppermost louver has a gutter defined by an upwardly angled lip.

6 Claims, 3 Drawing Sheets

(56) References Cited

U.S. PATENT DOCUMENTS

| | | | | |
|---|---|---|---|---|
| 2,847,728 | A * | 8/1958 | Shinall, Jr. | E04F 10/08 52/78 |
| 2,975,696 | A * | 3/1961 | Jewell | 454/147 |
| 3,157,104 | A * | 11/1964 | Nallinger | B60H 3/0641 454/147 |
| 3,185,243 | A * | 5/1965 | Burback | 180/68.1 |
| 4,022,599 | A * | 5/1977 | Wilson et al. | 62/244 |
| 4,212,659 | A * | 7/1980 | Magrini | B01D 45/08 55/385.3 |
| 4,242,951 | A * | 1/1981 | Bemiss | 454/146 |
| 4,466,654 | A * | 8/1984 | Abe | 296/192 |
| 4,476,820 | A * | 10/1984 | Nixon | B60K 11/00 123/195 C |
| 5,145,457 | A | 9/1992 | Tanigaito et al. | |
| 5,316,065 | A * | 5/1994 | Alligood | E06B 9/0638 160/170 |
| 5,320,652 | A * | 6/1994 | Akel | F22B 37/322 55/320 |
| 5,794,733 | A * | 8/1998 | Stosel et al. | 180/68.1 |
| 6,168,516 | B1 * | 1/2001 | White | 454/146 |
| 6,322,440 | B1 * | 11/2001 | Nakatani | 454/147 |
| 6,347,989 | B1 * | 2/2002 | Marko et al. | 454/147 |
| 6,439,991 | B1 * | 8/2002 | Jarnot | F24F 7/02 135/93 |
| RE38,157 | E * | 6/2003 | Schneider | B60H 1/28 296/192 |
| 6,955,593 | B2 | 10/2005 | Lewis et al. | |
| 6,991,531 | B2 | 1/2006 | Wijaya et al. | |
| 7,044,848 | B2 | 5/2006 | Wijaya et al. | |
| 7,197,885 | B2 * | 4/2007 | Kozak | B60H 1/00028 62/283 |
| 7,219,758 | B2 | 5/2007 | Guidry et al. | |
| 7,275,985 | B2 | 10/2007 | Lewis et al. | |
| 7,625,275 | B1 | 12/2009 | Hoke et al. | |
| 8,448,733 | B2 * | 5/2013 | Khouw et al. | 180/68.3 |
| 2004/0185767 | A1 | 9/2004 | Schneider | |
| 2006/0236662 | A1 * | 10/2006 | Currle | B62D 25/081 55/315 |
| 2007/0045029 | A1 * | 3/2007 | Nozaki | 180/291 |
| 2007/0251175 | A1 * | 11/2007 | Wexler | E06B 7/08 52/473 |
| 2008/0242213 | A1 * | 10/2008 | Mayer et al. | 454/275 |
| 2009/0242296 | A1 * | 10/2009 | Goldsberry | 180/68.3 |
| 2011/0247779 | A1 * | 10/2011 | Charnesky | B60K 11/085 454/75 |
| 2013/0303070 | A1 * | 11/2013 | Ozawa et al. | 454/151 |

FOREIGN PATENT DOCUMENTS

| | | | | |
|---|---|---|---|---|
| GB | 558062 | A * | 12/1943 | F21S 48/145 |
| GB | 1504909 | A * | 3/1978 | B01D 45/06 |
| JP | 2002021447 | A * | 1/2002 | |
| JP | 2003112659 | | 4/2003 | |
| JP | 2008137534 | A * | 6/2008 | |
| JP | 2009113542 | | 5/2009 | |
| JP | 2009190510 | | 8/2009 | |

* cited by examiner

LOUVERED RAIN-HAT FOR THE FRESH AIR INLET OF A VEHICLE

TECHNICAL FIELD

The disclosed invention relates generally to the fresh air intake for an automotive vehicle. More particularly, the disclosed invention relates to a rain-hat for use in relation to a vertical fresh air intake. The rain-hat utilizes louvers for flow redistribution and water separation on the vertical fresh air intake.

BACKGROUND OF THE INVENTION

Automotive vehicles include a fresh air inlet at the cowling provided between the forward-most part of the windshield and the rearward-most part of the engine hood. A screen is provided in the cowling to allow fresh air in while keeping leaves and other debris out. The fresh air intake is ordinarily provided at the passenger side of the vehicle. A run-off channel is formed along the forward part of the cowling to lead water away from the fresh air inlet and into and through a drain tube which discharges the water outside of the vehicle.

The fresh air inlet conventionally includes a rain-hat on the fresh air inlet opening of the heating, ventilation and air conditioning (HVAC) system and may or may not include a filter. The rain-hat is designed to limit the amount of moisture allowed to enter the air inlet. This moisture is typically in the form of liquid rain water. Rain-hat designs are directed to minimizing or entirely eliminating the entry of moisture into the air inlet. Such designs include the provision of an upright wall that places the inlet opening at a level higher than the run-off channel. This design allows fresh air to enter into the fresh air inlet while directing water away from the air inlet.

This straight forward design is generally effective at allowing fresh air to enter the fresh inlet while keeping out water. There are also aerodynamics which are to be taken into consideration. It is known that the conventional HVAC system experiences pressure drop created by highly non-uniform distribution of incoming air through the inlet, into the blower or across the air filter inlet face. Experimentation has shown that the maximum air velocities are observed on the air filter directly upstream of the cowl fresh air inlet region in designs with the filter in the rain-hat. This increased air velocity allows for the heavier water particles to get carried into the air filter. As the air filter becomes clogged with water, a greater pressure drop is experienced. The higher pressure drop across the conventional rain-hat forces the air blower motor (typically a scroll-type blower motor wheel) to draw more power from the vehicle in order to deliver the required air volume, resulting in electrical charge and fuel economy issues for the vehicle. The higher pressure drop can also result in additional humidity being pulled into the vehicle interior or with liquid water being pull through the filter and into the HVAC possibly causing failure modes.

Efforts have been made in the past to overcome these problems. These efforts are evidenced in, for example, U.S. Pat. No. 7,625,275, issued on Dec. 1, 2009, to Hoke et al. for "Aerodynamic Rain-Hat for Vehicle Air Intake"; U.S. Pat. No. 7,275,985, issued Oct. 2, 2007, to Lewis et al. for "HVAC Protection System for Automotive Vehicles"; U.S. Pat. No. 7,044,848, issued on May 16, 2006, to Wijaya et al. for "Fresh Air Intake for a Vehicle"; U.S. Pat. No. 6,991,531, issued on Jan. 31, 2006, to Wijaya et al. for "Fresh Air Intake for a Vehicle"; U.S. Pat. No. 6,955,593, issued Oct. 18, 2005, to Lewis et al. for "HVAC Protection System for Automotive Vehicles"; U.S. Reissue Pat. No. RE38,157, issued on Jun. 24, 2003, to Schneider for "Automotive Vehicle HVAC Rain-Hat"; U.S. Pat. No. 5,145,457, issued to Tanigaito et al. on Sep. 8, 1992, for "Ventilation Air Intake Structure of Motor Vehicle"; and U.S. Publication No. 2004/0185767, published Sep. 23, 2004, by Schneider for "Filter Housing Assembly for Transportation Vehicles."

Some of the advancements embodied in these inventions as well as others provide a vertical inlet rain-hat having a forward tilt. However, this approach does not generally allow for uniform air velocity on the air filter inlet face especially if the cowl volume is limited due to typical vehicle package constraints. This increases the pressure drop across the air filter and also allows for carrying heavier water particles into the air filter.

Accordingly, while these efforts represent advancements in the art of rain-hats for vehicle fresh air intakes, there remains room for improvement in this technology.

SUMMARY OF THE INVENTION

The disclosed invention provides an alternative arrangement to known rain-hats for the fresh air inlet of vehicles. Specifically, the disclosed invention provides a rain-hat system for use on a vehicle that includes a cowling having a fresh air inlet, a rain-hat assembly that includes a body, and a plurality of louvers. The body has a back side for attachment to the fresh air inlet. The body also has front side to which the plurality of louvers is attached. The rain-hat assembly also includes a front, a back, a first side and a second side. At least some of the louvers slope downwardly from the front to the back and at least some of the louvers slope downwardly from the first side to the second side. In addition, at least some of said louvers include a downwardly sloping flange attached at the first side and a downwardly sloping flange attached at the second side. Preferably the uppermost louver has a gutter defined by an upwardly angled lip.

Optionally but not necessarily an interchangeable filter may be included in the rain-hat or the HVAC system. The body also includes a rain channel formed along its bottom to direct water to the cowl drain. A cowl is disposed over the louvers.

The louvered design improves the flow uniformity through the fresh air inlet or on the air filter inlet face where the filter is optional and reduces the maximum velocities on the air filter (if present) or through the fresh air inlet. This improves the pressure drop across the air filter (again, if present) or through the fresh air inlet. The angled louvers also act as water separators to remove the heavier water particles from the stream. This occurs by centrifugal force as the air stream accelerates around the louvers to travel to the air filter inlet face.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
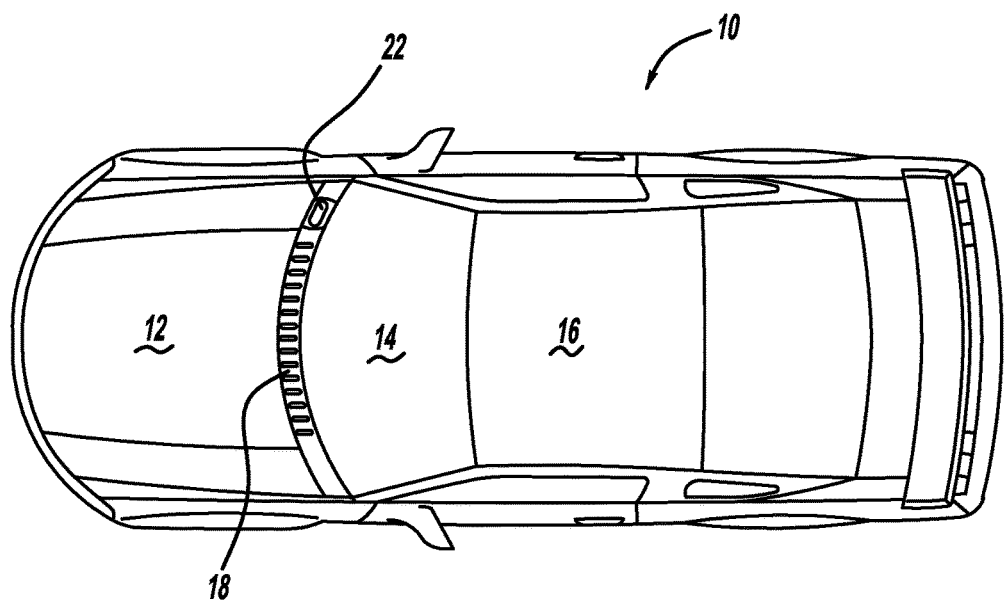
FIG. 1 is a schematic top plan view of an automotive vehicle on which a rain-hat incorporating the principles of the instant invention can be used.

In the following figures, the same reference numerals will be used to refer to the same components. In the following description, various operating parameters and components are described for different constructed embodiments. These specific parameters and components are included as examples and are not meant to be limiting.

Referring to FIG. 1, a top view of an automotive vehicle, generally illustrated as 10, is shown. The automotive vehicle 10 is provided with a rain-hat associated with the fresh air intake opening into the heating, ventilation and air conditioning system to block the flow of free water into the opening while allowing the flow of fresh air through the opening. The automotive vehicle 10 is formed with an engine hood 12 located at the front of the automotive vehicle 10 and a windshield 14. The windshield 14 slopes upwardly and rearwardly from the engine hood 12 to join with a roof structure 16.

Figure 2:
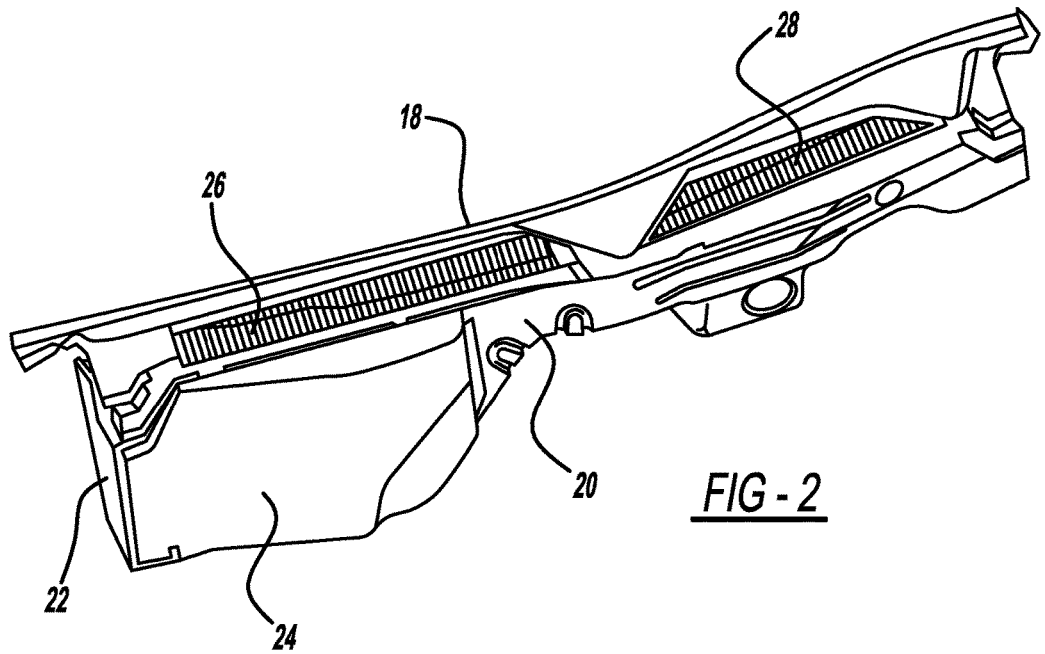
FIG. 2 is a perspective view of an automotive cowl housing the louvered rain-hat of the disclosed invention.
Figure 3:
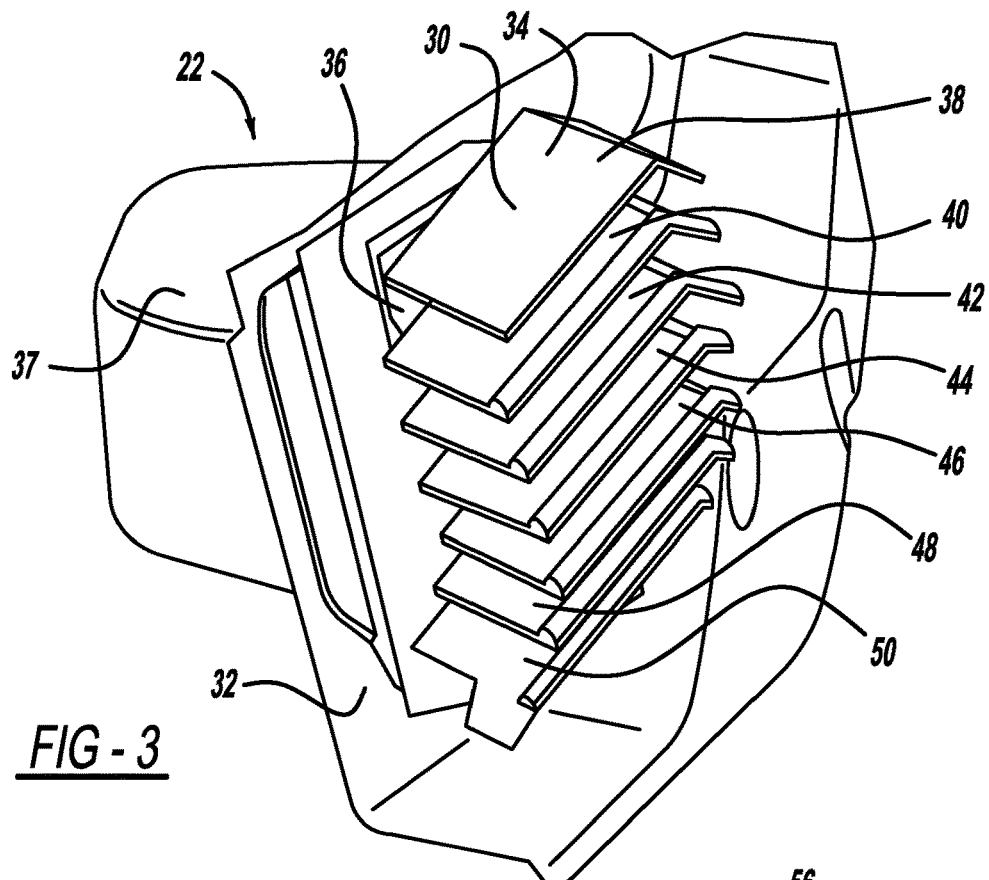
FIG. 3 is a perspective view of a rain-hat of the disclosed invention inside of a rain-hat housing shown in partial section.

Between the engine hood 12 and the windshield 16 is a cowling 18. As is known, the cowling 18 functions to draw fresh air into the heating, ventilation and air conditioning system (HVAC) of the automotive vehicle 10. The cowling 18 is best seen in FIG. 2 and forms a laterally extending channel 20 that terminates at a louvered rain-hat assembly 22 associated with the fresh air inlet opening typically but not exclusively near the passenger side of the vehicle 10. The louvered rain-hat assembly 22 includes a rain-hat assembly cowl 24 formed from sheet metal or plastic. The cowling 18 typically includes a pair of side-by-side leaf screens 26 and 28 that restrict passage of any larger item such as a leaf or a branch from entering into the channel 20.

The louvered rain-hat assembly 22 is shown in FIGS. 3 through 6. With reference thereto, the louvered rain-hat assembly 22 includes a louvered rain-hat 30 that includes a body 32. Attached to the front of the body 32 is a louver array 34. The back of the body 32 is attached to a plenum 37 of the fresh air inlet. It is to be noted that references to "front" of the body 32 and "back" of the body 32 are only for convenience as the body 32 may be positioned in any of a variety of directions, such that the "back" of the body 32 faces vehicle forward and the "front" of the body faces vehicle rearward. Accordingly, the "front" and "back" references are only for descriptive purposes and are not intended as being limiting.

Substantially within the body 32 an optional fresh air inlet filter element 36 of the type known in the art may be provided. Preferably but not absolutely the fresh air inlet filter element 36 may be interchangeable.

The louver array 34 includes a plurality of louvers which are generally strategically angled. The louvered arrangement of the disclosed rain-hat reduces the amount of water particles that enter the fresh air inlet filter element 36 and to thus keep the fresh air inlet filter element 36 as dry as possible. As previously noted, the angled louvers of the louver array 34 separate heavier water particles from the air stream, thus preventing the water from actually entering the fresh air inlet filter element 36 and instead diverting the water away from the fresh air inlet filter element 36. This occurs by centrifugal force as the air stream accelerates around the louvers to travel to the air filter inlet face as will be explained below.

The louver array 34 includes a plurality of louvers including an upper louver 38 and lower louvers 40, 42, 44, 46, 48, and 50. The upper louver 38 includes an upwardly angled lip 52 that defines a rain gutter 54. The width of the upwardly angled lip 52 may be of any of a variety of widths such as 15 mm, a measurement that is intended as being suggestive and non-limiting. As illustrated in FIGS. 3 through 6 the upper louver 38 has an oblique angle. This oblique design is angled to divert the water by gravity away from the fresh air inlet and toward the cowl drain. The rain gutter 54 also prevents water from the leaf screens 26 and 28 from directly falling in front of the lower louvers 40, 42, 44, 46, 48, and 50. The louvers also drastically improve the flow uniformity on the inlet face of the fresh air inlet filter element 36 allowing for better utilization of the face area of the fresh air inlet filter element 36 and also allowing for a reduction in pressure drop across the fresh air inlet filter element 36.

At the leading edge of each of the lower louvers 40, 42, 44, 46, 48, and 50 are beads 56, 58, 60, 62, 64, and 66 respectively. The beads 56, 58, 60, 62, 64, and 66 direct the water droplets along their respective louvers toward the cowl drain. The beads 56, 58, 60, 62, 64, and 66 may be any of a variety of widths but a suggested though non-limiting width is 3 mm.

Figures 5, 6:
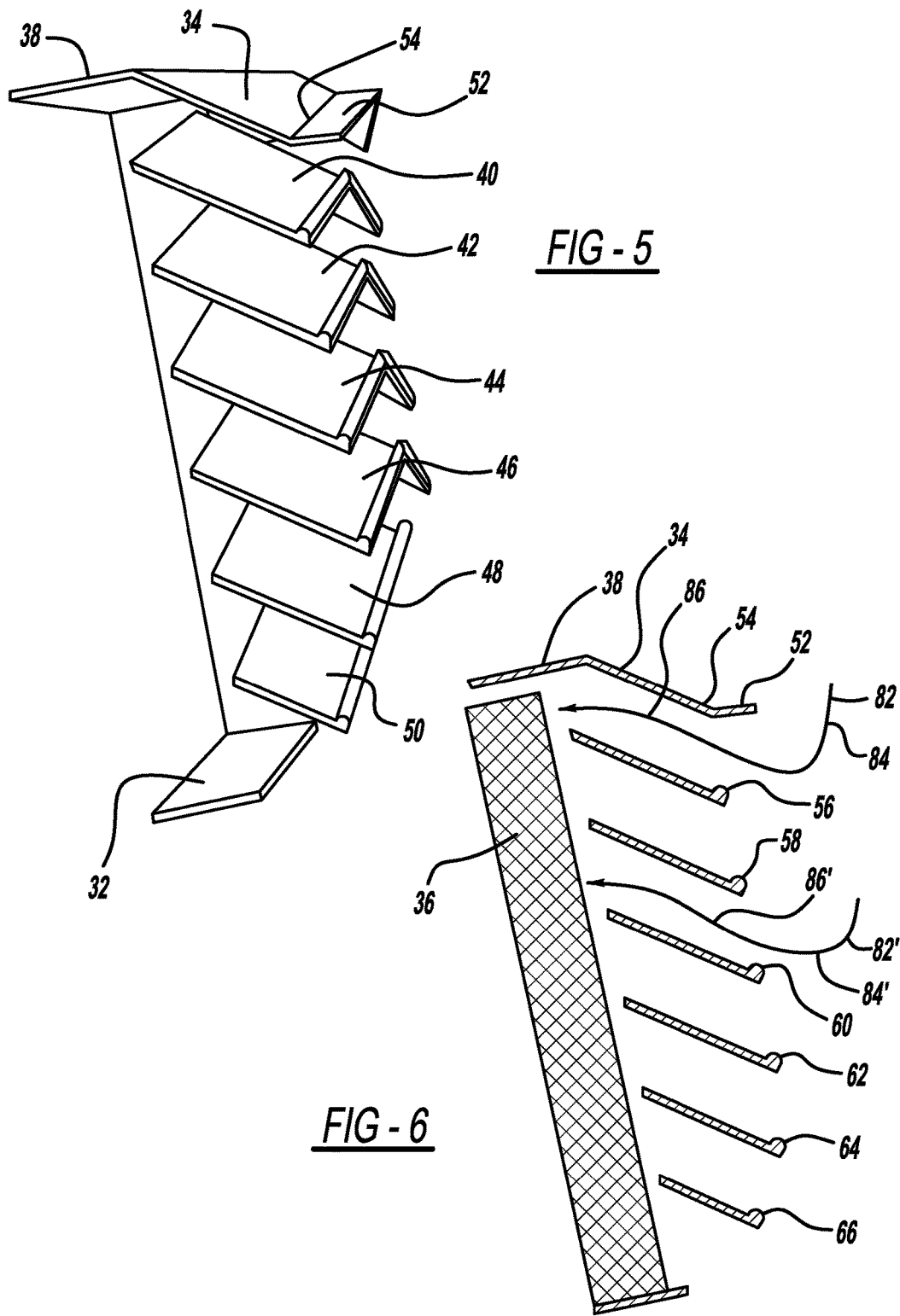
FIG. 5 is a perspective sectional view taken along line 5-5 of FIG. 4.
FIG. 6 is a sectional end view of the view taken along line 6-6 of FIG. 4.

The lower louvers 40, 42, 44, 46, 48, and 50 are provided at an angle from the horizontal from front to back as illustrated most clearly in FIG. 6. The angle illustrated is about 60 degrees although other angles may be suitable for this purpose.

Figure 4:
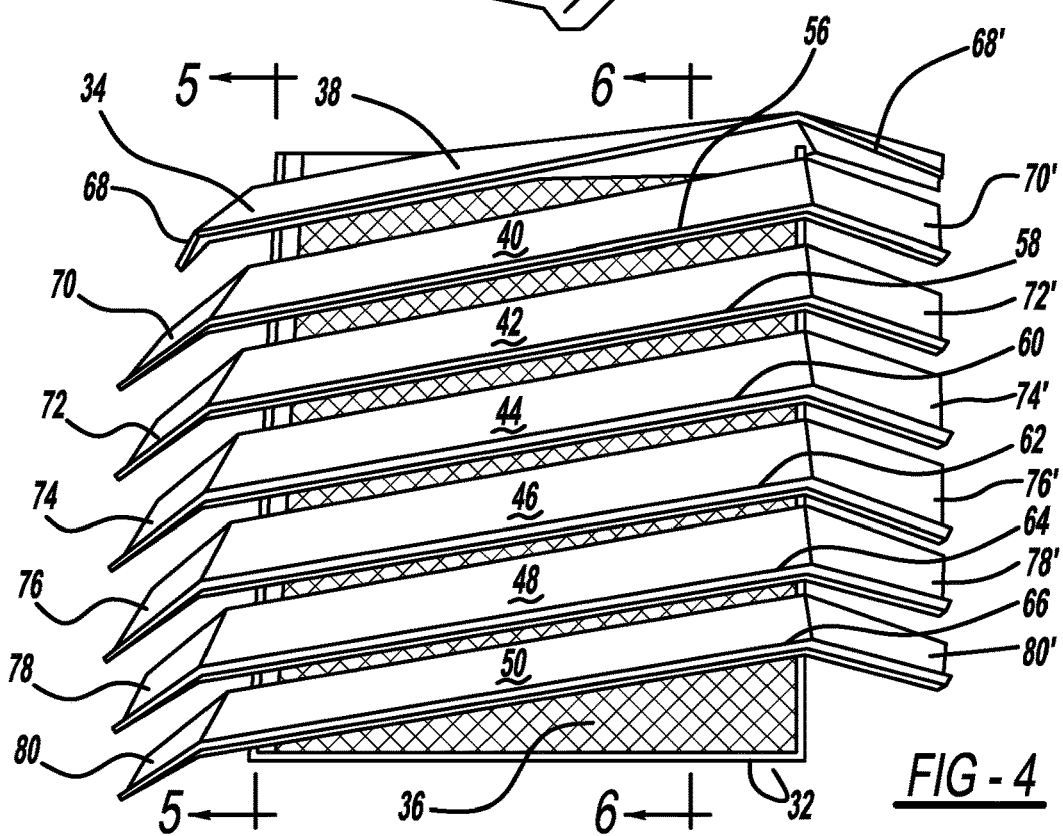
FIG. 4 is a front view of the rain-hat of the disclosed invention.

The upper louver 38 and the lower louvers 40, 42, 44, 46, 48, and 50 also are angled from the horizontal from side to side as best illustrated in FIG. 4.

To further enhance the effectiveness of the louvered rain-hat assembly 22 each of the upper louver 38 and the lower louvers 40, 42, 44, 46, 48, and 50 may be fitted with one or a pair of lateral downwardly sloping flanges. Particularly, and with reference mainly to FIG. 4, the upper louver 38 may be fitted with one or both of lateral downwardly sloping flanges 68 and 68', the lower louver 40 may be fitted with one or both of lateral downwardly sloping flanges 70 and 70', the lower louver 42 may be fitted with one or both of lateral downwardly sloping flanges 72 and 72', the lower louver 44 may be fitted with one or both of lateral downwardly sloping flanges 74 and 74', the lower louver 46 may be fitted with one or both of lateral downwardly sloping flanges 76 and 76', the lower louver 48 may be fitted with one or both of lateral downwardly sloping flanges 78 and 78', and the lower louver 50 may be fitted with one or both of lateral downwardly sloping flanges 80 and 80'.

The operation of louvered rain-hat assembly 22 of the disclosed invention is schematically represented with the flow of air being depicted by the arrows. As noted above, the lower louvers 40, 42, 44, 46, 48, and 50 are provided at an angle from the horizontal as illustrated most clearly in FIG. 6. By being angled from the horizontal incoming air 82 and 82' is forced to make a sharp turn 84 and 84' to travel at an upward angle to the face of the fresh air inlet filter element 36. This sharp turn at 84 and 84' acts as a water separator by centrifugal force as noted above whereby water droplets fall out of the air flow stream and hit the top surface of the louver below. These particles then coagulate to form droplets. Since the lower louvers 40, 42, 44, 46, 48, and 50 are angled, the droplets on the top surface of the louvers travel under gravity toward the leading edges along the beads 56, 58, 60, 62, 64, and 66 of the lower louvers 40, 42, 44, 46, 48, and 50 and water is thereby directed toward the cowl drain.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A rain-hat system for use on a vehicle comprising:
    a cowling having a fresh air inlet;
    a rain-hat assembly including a body, said body having a bottom wall, a back side for attachment to said fresh air inlet and a front side;
    an upper louver attached to said front side of said assembly, said upper louver having two lateral ends, a first downward-depending flange attached to one lateral end and a second downward-depending flange attached to another lateral end, an outer side and an assembly-facing side, said upper louver sloping from said assembly-facing side to said outer side, said upper louver being angled relative to said bottom wall such that one of its flanges is lower than the other of its flanges; and
    a plurality of lower louvers attached to said front side of said assembly, each of said lower louvers having two lateral ends, a first lower louver downward-depending flange attached to one lateral end and second louver downward-depending flange attached to another lateral end, an outer side and an assembly-facing side, said lower louvers being angled relative to said bottom wall such that one of its flanges is lower than the other of its flanges.

2. The rain-hat system of claim 1, in which a bead is attached to an upper face of at least one of the plurality of lower louvers, said first downward-depending flange, and said second louver downward-depending flange.

3. The rain-hat system of claim 1 further including a filter disposed substantially within said body.

4. The rain-hat system of claim 1 further including a rain channel formed at the bottom of said body.

5. The rain-hat system of claim 1 further including a cowl disposed substantially over said plurality of lower louvers.

6. The rain-hat system of claim 1 wherein said plurality of lower louvers are parallel.

* * * * *